(12) United States Patent
Tsai et al.

(10) Patent No.: US 9,459,675 B2
(45) Date of Patent: Oct. 4, 2016

(54) MULTI-BATTERY POWER SUPPLY SYSTEM

(71) Applicant: ASUSTeK COMPUTER INC., Taipei (TW)

(72) Inventors: Cheng-Yu Tsai, Taipei (TW); Ching-Han Lee, Taipei (TW); Chih-Wan Hsu, Taipei (TW); Hsi-Ho Hsu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 255 days.

(21) Appl. No.: 14/246,156

(22) Filed: Apr. 7, 2014

(65) Prior Publication Data

US 2014/0317423 A1   Oct. 23, 2014

(30) Foreign Application Priority Data

Apr. 17, 2013   (TW) .............................. 102113618 A

(51) Int. Cl.
*G06F 1/26* (2006.01)
*G06F 1/16* (2006.01)

(52) U.S. Cl.
CPC ............. *G06F 1/263* (2013.01); *G06F 1/1635* (2013.01)

(58) Field of Classification Search
None
See application file for complete search history.

(56) References Cited

U.S. PATENT DOCUMENTS

| | | | |
|---|---|---|---|
| 6,604,199 B1 * | 8/2003 | Yang ...................... | G06F 1/1632 710/303 |
| 6,888,338 B1 * | 5/2005 | Popescu-Stanesti .... | G06F 1/263 320/137 |
| 7,017,055 B1 * | 3/2006 | Ho .......................... | G06F 1/266 307/46 |
| 2005/0168937 A1 | 8/2005 | Yin et al. | |
| 2010/0244765 A1 | 9/2010 | Collopy et al. | |

* cited by examiner

*Primary Examiner* — Kim Huynh
*Assistant Examiner* — Paul J Yen
(74) *Attorney, Agent, or Firm* — CKC & Partners Co., Ltd.

(57) ABSTRACT

A multi battery power system includes an electronic device and an extension dock. The electronic device includes a first power storage module, a first connector, a second connector and a power conversion module. The first power storage module includes a first power storage unit. The first connector is coupled to the first power storage module. The power conversion module is coupled between the first power storage unit and the second connector, and converts power stored in the first power storage unit into a converted output voltage and transmits the converted output voltage to the second connector. The extension dock includes a third connector and an electrical load. The third connector is paired with and selectively connected to the second connector of the electronic device. The electrical load is coupled to the third connector, and selectively receives the converted output voltage from the electronic device via the third connector.

11 Claims, 2 Drawing Sheets

MULTI-BATTERY POWER SUPPLY SYSTEM

CROSS-REFERENCE TO RELATED APPLICATION

This application claims the priority benefit of Taiwan application serial No. 102113618, filed on Apr. 17, 2013. The entirety of the above-mentioned patent application is hereby incorporated by reference herein and made a part of specification.

BACKGROUND OF THE INVENTION

1. Field of the Invention

The invention relates to a power supply system and, more particularly, to a power supply circuit between an electronic device and an extension dock.

2. Description of the Related Art

Since the demand of the mobile products on extension devices including a battery module increases, such as an external keyboard, an external hard disk, an external CD-ROM driver, and an external card reader and other external dockings, the design on the power of the external docking becomes more important. However, if the circuit and the control logic in the extension dock can be decreased, the cost and the volume for the product can be reduced.

Generally, when an electronic device is connected with an extension dock, a power path is formed between the electronic device and the extension dock. The power path is used to transmit the power signal between the electronic device and the extension dock. Generally, while converting the power direction, the current direction in the power path should be controlled after both the state of the electronic device and the extension dock are determined. It can avoid that electric signals with different specifications of the extension dock are directly transmitted to a battery of the electronic device without adjustment, which may damage the battery.

BRIEF SUMMARY OF THE INVENTION

A power supply circuit in a multi-battery power system between an electronic device and an extension dock is provided, and power supply paths are formed from the extension dock to the electronic device and from the electronic device to the extension dock, respectively. Consequently, it can avoid that the bi-directional current shares the same power supply path and excludes the use of complex bi-directional current control switches, further, the damages of the power storage components of the electronic device or the extension dock by the abnormal current direction is also avoided. Moreover, the electronic device and the extension dock can share a power conversion module of the electronic device and save the electronic components needed in the extension dock.

A multi-battery power system is provided, and it includes an electronic device and an extension dock. The electronic device includes a first power storage module, a first connector, a second connector and a power conversion module. The first power storage module includes a first power storage unit. The first connector is coupled to the first power storage module. The power conversion module is coupled between the first power storage unit and the second connector, and converts power stored in the first power storage unit into a converted output voltage and transmits the converted output voltage to the second connector. The extension dock includes a third connector and an electrical load. The third connector is paired with and selectively connected to the second connector of the electronic device. The electrical load is coupled to the third connector and selectively receives the converted output voltage from the electronic device via the third connector.

DETAILED DESCRIPTION OF THE EMBODIMENTS

Figure 1:
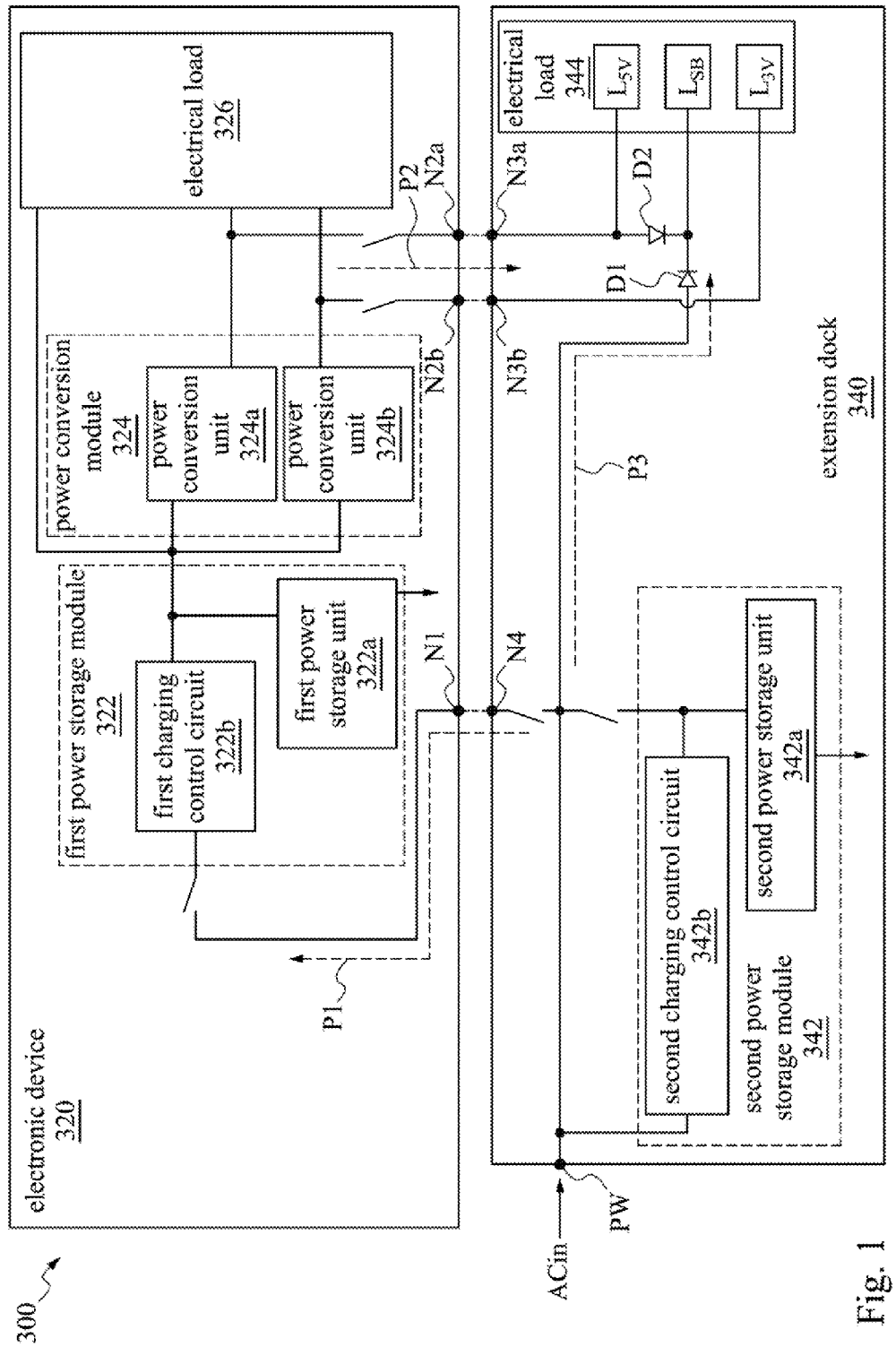
FIG. 1 is a schematic diagram showing that a multi-battery power supply system in an embodiment.

Please refer to FIG. 1. FIG. 1 is a schematic diagram showing that a multi-battery power system 300 in an embodiment. As shown in FIG. 1, the multi-battery power system 300 includes an electronic device 320 and an extension dock 340.

In the embodiment, the electronic device 320 may be a tablet, a mobile internet device or a handheld electronic device such as a smart phone, which is not limited herein.

The electronic device 320 (such as a tablet computer) and the extension dock 340 include a power storage unit (such as a battery) respectively. Generally speaking, in consideration of the portability of the tablet computer, the space and the weight of the power storage unit have limitations, however, it is difficult to provide large power storage capacity, and thus the endurance of the tablet computer is limited. When the electronic device 320 is connected with the extension dock 340, the power storage unit of the extension dock 340 can provide additional power storage capacity, and thus enhance the endurance of the electronic device 320, and the expansion function and interface are diversified.

When the electronic device 320 is detached from the extension dock 340, the power storage unit of the electronic device 320 and that of the extension dock 340 supply power to keep the operation of the electronic device 320 (such as, multimedia playing, wireless transmission, network communication) and the standby operation of the extension dock 340 (such as, basic light displaying, power storage alerting), respectively.

As shown in FIG. 1, the electronic device 320 includes a first connector N1, second connectors N2$a$ and N2$b$, a first power storage module 322 and a power conversion module 324. Additionally, the electronic device 320 further includes other internal electrical loads 326, such as, a processor, a memory, a display, a wireless communication circuit.

In the embodiment, the first power storage module 322 may include a first power storage unit 322$a$ and a first charging control circuit 322$b$. The first power storage unit 322$a$ is a charging and discharging power component, the first charging control circuit 322$b$ can be integrated into the control circuit of the charging and discharging power component (for example, it is disposed in the battery), or it is an independent charging control circuit.

As shown in FIG. 1, the extension dock 340 includes an input interface PW, a fourth connector N4, third connectors N3$a$ and N3$b$, and a second power storage module 342. In addition, the extension dock 340 further includes other internal electrical loads 344, such as a microcontroller, a memory unit, a light, a speaker, an extension interface. For example, the extension interface is a HDMI video connection interface.

In the embodiment, the second power storage module 342 includes a first power storage unit 342a and a second charging control circuit 342b. The second power storage unit 342a may be a charging and discharging power component, and the second charging control circuit 342b can be integrated into the control circuit of the charging and discharging power component, or it is an independent charging control circuit. When the electronic device 320 is connected with the extension dock 340, their power supply lines are connected with each other. In the embodiment, the first connector N1 of the electronic device 320 is paired with and connected to the fourth connector N4 of the extension dock 340, meanwhile, the second connectors N2a and N2b of the electronic device 320 are paired with and connected to the third connectors N3a and N3b of the extension dock 340.

In the embodiment, an unidirectional first power supply path P1 is formed from the extension dock 340 to the electronic device 320 via the fourth connector N4 to the first connector N1, and an unidirectional second power supply path P2 is formed from the electronic device 320 to the extension dock 340 via the second connectors N2a and N2b to the third connectors N3a and N3b.

The power transmission relationship between the electronic device 320 and the extension dock 340 is illustrated hereinafter.

First, the first power supply state is that the electronic device 320 is connected with the extension dock 340, and the input interface PW of the extension dock 340 is electronically connected to an external AC input (such as an electric supply, or an external AC power adapter). The external AC input is transmitted to the second charging control circuit 342b via the input interface PW. The second charging control circuit 342b is coupled between the input interface PW and the second power storage unit 342a, and the second charging control circuit 342b converts input power of the input interface PW to charge the second power storage unit 342a.

At the same time, the external AC input is transmitted to the charging control circuit 322b via the input interface PW and the first power supply path P1. The charging control circuit 322b is coupled between the first connector N1 and the first power storage unit 322a, and converts input power of the first connector N1 to charge the first power storage unit 322a.

The power conversion module 324 is coupled between the first power storage unit 322a and the second connectors N2a and N2b, and it is used to convert power stored in the first power storage unit 322a into an output voltage and transmits the converted input voltage to the second connectors N2a and N2b, and the converted input voltage is supplied to the electrical load 344 of the extension dock 340 via the second power supply path P2. Practically, the power conversion module 324 may include kinds of power conversion components such as a variable voltage circuit, a rectifying circuit, a voltage regulator circuit, an impedance matching circuit, which is not limited herein.

Moreover, the converted output voltage generated by the power conversion module 324 is also supplied to the electrical load 326 of the electronic device 320 at the same time.

By the above power supply means, the power conversion module 324 does not need to be disposed at the extension dock 340, and the extension dock 340 can share the converted output voltage generated by the power conversion module 324 of the electronic device 320. In the embodiment, it is supposed that the power supply voltage needed in the extension dock 340 includes two specifications of system voltages: 5V and 3V, which is not limited herein. Therefore, the power conversion module 324 includes two groups of the power conversion units, for example, a power conversion unit 324a and a power conversion unit 324b are used to generate 5V and 3 V system voltages, respectively, and the system voltages are transmitted to the extension dock 340 via the second connectors N2a and N2b, and the third connectors N3a and N3b.

Practically, if the power voltage used in the extension dock 340 includes K kinds of different specifications voltages, the power conversion module 324 may include K groups of power conversion units, and the second connector and the third connector include K different connection nodes respectively, wherein K is a positive integer greater than 1.

Then, another power supply state is that the electronic device 320 is connected to the extension dock 340, and the external AC input is not connected to the input interface PW of the extension dock 340.

At the moment, the second power storage unit 342a transmits the storage power to the first charging control circuit 322b via the first power supply path P1. The charging control circuit 322b is used to convert power from the second power storage unit 342a and transmits the converted power to the first power storage unit 322a and the power conversion module 324. Therefore, it is the same as that the second power storage unit 342a and the first power storage unit 322a supply the power to the power conversion module 324 in series.

According to the total storage power via the second power storage unit 342a and the first power storage unit 322a connected in series, the power conversion module 324 converts the storage power to the converted output voltage and supplies the converted output voltage to the electrical load 326 of the electronic device and the electrical load 344 of the extension dock 340 via the second supply path P2

In the embodiment, the electrical load 344 of the extension dock 340 may include multiple different electrical specifications of the load components, for example, in the embodiment, the electrical load 344 may include a load $L_{5V}$ which needs 5V voltage, a load $L_{3V}$ which needs 3V voltage, and a load $L_{SB}$ operating at the standby voltage.

For example, the load components $L_{5V}$ and $L_{3V}$ of the extension dock 340 only can be enabled when the electronic device 320 is connected with the extension dock 340, for example, the load component is a keyboard, an expanded memory, a microphone. When the electronic device 320 is connected with the extension dock 340, the two groups of power conversion units (a power conversion unit 324a and a power conversion unit 324b) in the power conversion module 324 are used to generate the system voltages of 3V and 5V, respectively, and they transmit the system voltages to the load component $L_{5V}$ and $L_{3V}$ via the second connectors N2a and N2b and the third connectors N3a and N3b.

Figure 2:
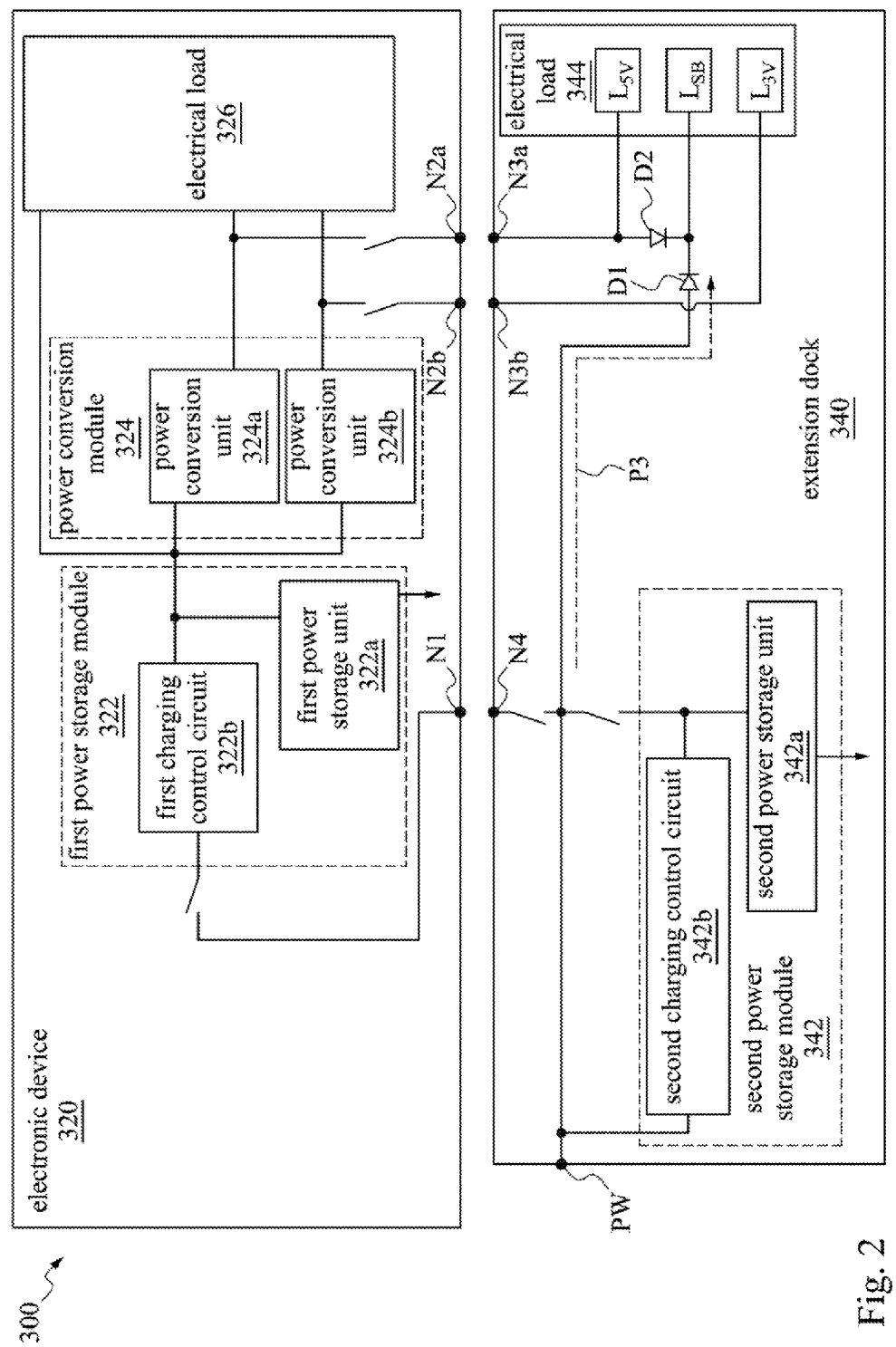
FIG. 2 is a schematic diagram showing that an electronic device in FIG. 1 is detached from the extension dock.

Moreover, another power supply state is that the electronic device 320 is detached from the extension dock 340. FIG. 2 is a schematic diagram showing that the electronic device 320 in FIG. 1 is detached from the extension dock 340. As shown in FIG. 2, when the electronic device 320 is detached from the extension dock 340, the first power storage unit 322a of the electronic device 320 supplies power to the electronic device 320. The load component $L_{SB}$ of the extension dock 340 which keeps operating under the standby mode still keeps operating when the electronic device 320 is detached from the extension dock 340.

Most main functions of the extension dock 340 is shut off when the extension dock 340 is detached from the electronic device 320, for example, the load components $L_{5V}$ and $L_{3V}$ are shut off, and the extension dock 340 enters into the standby module. However, in the standby module, some power is still needed to supply to the load component $L_{SB}$ of the extension dock 340 which always operates under the standby module. The load component Ls may be a micro-controller, a memory unit, an indicator light under the standby mode. In the embodiment, another direct third power path P3 is arranged between the second power storage module 342 of the extension dock 340 and the load component $L_{SB}$ of the electrical load 344. The second power storage unit 342a can supply power to the electrical load 344 which also keeps basic operation under the standby module (which is always-on components $L_{SB}$ under the standby module) via the direct third power path P3.

Please refer to FIG. 1 and FIG. 2 together. The direct third power path P3 between the second power storage unit 342a and the load component $L_{SB}$ is conducted when the extension dock 340 is detached from the electronic device 320, so that the second power storage unit 342a supplies power to the load component $L_{SB}$.

A diode D1 is arranged on the third power supply path P3 of the extension dock 340, so that the third power supply path P3 forms an unidirectional current direct path. When the electronic device 320 is connected with the extension dock 340, the diode D1 is used to avoid that the power signal supplied by the electronic device 320 via the second power supply path P2 passes through the third power supply path P3 oppositely and affects the second power storage unit 342a or forms the short circuit.

Moreover, a diode D2 is arranged between the electrical load 344 and the third connector N3a. When the electronic device 320 is connected with the extension dock 340, the diode D2 is used to avoid that the power signal supplied by the third power supply path P3 in the extension dock 340 oppositely passes through the second power supply path P2 and affects the electronic device 320.

When the electronic device 320 is connected with the extension dock 340, the power signal (the converted input voltage) generated by the electronic device 320 is supplied to the extension dock 340 via an independent path (the second power supply path P2), consequently, it does not need to design multiple groups of power conversion circuits in the extension dock 340 for different electrical components as the conventional way. In the embodiment of the invention, whether the path from electronic device 320 to the extension dock 340 or from the extension dock 340 to the electronic device 320 is conducted or not does not need to be confirmed by the electronic device 320 and the extension dock 340, and the extension dock 340 can charge the electronic device 320 and the electronic device 320 can discharge to the extension dock 340 as long as the power is enough.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A multi-battery power system, comprising:
    an electronic device, including:
        a first power storage module including a first power storage unit;
        a first connector coupled to the first power storage module;
        a second connector; and
        a power conversion module coupled between the first power storage unit and the second connector, and converting power stored in the first power storage module into a converted output voltage and transmitting the converted output voltage to the second connector; and
    an extension dock including:
        an input interface used to electronically connect to an external AC input;
        a third connector paired with and selectively connected to the second connector of the electronic device; and
        an electrical load coupled to the third connector;
        wherein when the electronic device is connected with the extension dock, the output voltage converted by the power conversion module of the electronic device used to operate the electrical load of the extension dock originates from the AC input received at the input interface of the extension dock.

2. The multi-battery power system according to claim 1, wherein the first power storage module further includes a first charging control circuit coupled between the first connector and the first power storage unit to convert input power of the first connector to charge the first power storage unit.

3. The multi-battery power system according to claim 1, wherein the extension dock further includes:
    a second power storage module coupled to the input interface and including a second power storage unit; and
    a fourth connector coupled to the input interface and the second power storage unit and selectively connected to the first connector of the electronic device.

4. The multi-battery power system according to claim 3, wherein the second power storage module further includes a second charging control circuit coupled between the input interface and the second power storage unit to convert input power of the input interface to charge the second power storage unit.

5. The multi-battery power system according to claim 3, wherein when the electronic device is connected with the extension dock, the first connector of the electronic device is paired with and connected to the fourth connector of the extension dock, and a power supply path from the extension dock to the electronic device is formed via the fourth connector to the first connector.

6. The multi-battery power system according to claim 5, wherein when the electronic device is connected with the extension dock, the extension dock transmits an external AC input or power stored in the second power storage unit to the electronic device via the fourth connector and the first power supply path.

7. The multi-battery power system according to claim 3, wherein the electrical load of the extension dock includes a first load component and a second load component, and when the electronic device is not connected with the extension dock, the power supplied to the first load component is cut off.

8. The multi-battery power system according to claim 7, wherein a power supply path is arranged between the second power storage module and the second load component, and the power supply path is conducted and supplies power to the second load component when the electronic device is not connected with the extension dock.

9. The multi-battery power system according to claim 1, wherein when the electronic device is connected with the extension dock, the second connector of the electronic device is paired with and connected to the third connector of the extension dock, a power supply path is formed from the electronic device to the extension dock via the second connector to the third connector.

10. The multi-battery power system according to claim 9, wherein when the electronic device is connected with the extension dock, the electronic device transmits the converted output voltage to the extension dock via the second connector and the power supply path.

11. The multi-battery power system according to claim 5, wherein the first power storage module of the electronic device further includes a first charging control circuit, and when the electronic device is connected with the extension dock, the external AC input received at the input interface of the extension dock is transmitted to the first charging control circuit of the first power storage module of the electronic device via the fourth connector and the first connector, the first charging control circuit converts the AC input to charge the first power storage unit, and the power conversion module of the electronic device converts the power stored in the first power storage module.

* * * * *